(12) United States Patent
Shimokawa et al.

(10) Patent No.: US 8,304,009 B2
(45) Date of Patent: Nov. 6, 2012

(54) METHOD OF PRODUCING PROCESSED TOMATO PRODUCT HAVING INCREASED TOMATO AROMA

(75) Inventors: Hiroyuki Shimokawa, Nasushiobara (JP); Takahiro Kawana, Nasushiobara (JP); Kiro Hayakawa, Nasushiobara (JP)

(73) Assignee: Kagome Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/293,551

(22) Filed: Nov. 10, 2011

(65) Prior Publication Data

US 2012/0058233 A1 Mar. 8, 2012

Related U.S. Application Data

(63) Continuation of application No. PCT/JP2009/060852, filed on Jun. 15, 2009.

(51) Int. Cl.
*A23L 1/015* (2006.01)
(52) U.S. Cl. ........................... 426/474; 426/487
(58) Field of Classification Search .................. 426/474, 426/487
See application file for complete search history.

(56) References Cited

U.S. PATENT DOCUMENTS

| | | | | |
|---|---|---|---|---|
| 1,896,529 A * | 2/1933 | Tressler et al. | ................... | 426/68 |
| 1,978,078 A * | 10/1934 | Eberts | ........................... | 426/388 |
| 2,054,066 A * | 9/1936 | Ayers et al. | ................... | 426/407 |
| 2,097,855 A * | 11/1937 | Eberts | ............................. | 99/468 |
| 2,104,710 A * | 1/1938 | Blanck et al. | ................. | 426/399 |
| 2,440,676 A * | 5/1948 | Dunkley | ........................ | 426/489 |
| 2,901,356 A * | 8/1959 | Gallotti | ......................... | 426/320 |
| 3,117,877 A * | 1/1964 | Byer et al. | ..................... | 426/387 |
| 3,310,410 A * | 3/1967 | Lang et al. | ..................... | 426/387 |
| 4,369,197 A * | 1/1983 | Basel et al. | .................... | 426/270 |
| 4,971,811 A * | 11/1990 | Strobel et al. | ................... | 426/50 |
| 4,971,813 A * | 11/1990 | Strobel et al. | ................... | 426/51 |
| 5,035,909 A * | 7/1991 | Lomelin et al. | ............... | 426/473 |
| 7,635,496 B2 * | 12/2009 | Romeo | ......................... | 426/615 |
| 7,709,040 B2 * | 5/2010 | Romeo | ......................... | 426/615 |
| 2002/0044994 A1* | 4/2002 | Spencer | ........................ | 426/312 |
| 2010/0136193 A1* | 6/2010 | Romeo | ......................... | 426/489 |

* cited by examiner

*Primary Examiner* — Anthony Weier
(74) *Attorney, Agent, or Firm* — Weaver Austin Villeneuve & Sampson LLP

(57) ABSTRACT

A method is provided for producing a processed tomato product having more tomato aroma inherent to grown tomatoes. Tomato fruits are washed and crushed. Juice is extracted from the crushed material, the extracted juice is deaerated and the deaerated material is heated. The crushed material and the extracted juice from immediately after the crushing until immediately before the deaerating are maintained at temperature of 15-40° C. The dissolved oxygen concentration of the crushed tomatoes and/or the extracted juice from immediately after the crushing until immediately before the deaerating is raised at least temporarily to 6 mg/L or over, and the dissolved oxygen concentration of the deaerated juice immediately before the heating is reduced to 3.5 mg/L or below.

16 Claims, 1 Drawing Sheet

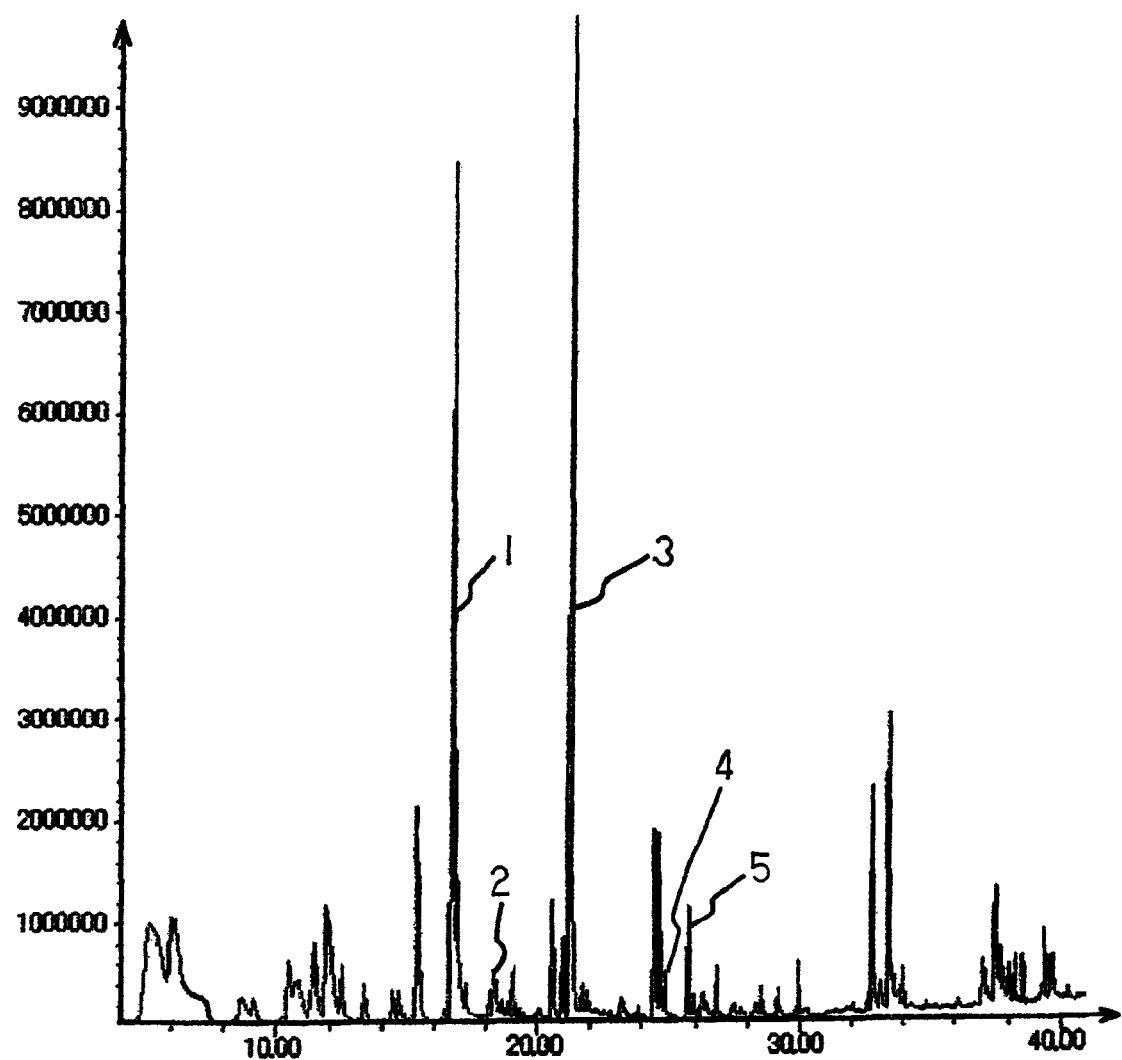

METHOD OF PRODUCING PROCESSED TOMATO PRODUCT HAVING INCREASED TOMATO AROMA

This application is a continuation of International Application No. PCT/JP2009/060852, filed Jun. 15, 2009.

BACKGROUND OF THE INVENTION

This invention relates to a method of producing a processed tomato product. More particularly, this invention relates to a method of producing such a processed tomato product having more tomato aroma inherent to grown tomatoes (hereinafter also referred to as "tomato fruit").

Processed tomato products such as tomato juice, pureed tomato, tomato pastes and tomato ketchup are generally being produced by washing tomato fruit, preliminarily heating (primarily for enzyme deactivation) washed tomato fruit, extracting juice from the preliminarily heated washed material, heating (primarily for sterilization) or further condensing and similarly heating such an extracted juice after mixing. Processed tomato products thus obtained, however, still have the problem of not sufficiently having the aroma inherent to tomato fruit.

In order to produce processed tomato products sufficiently provided with tomato aroma inherent to tomato fruit, there have therefore been proposed a method of carrying out a preliminary heating process prior to crushing washed tomatoes (such as disclosed in Japanese Patent Publication Tokkai 2002-330719), a method of crushing washed tomatoes and immediately thereafter carrying out a preliminary heating process on the crushed tomatoes under a specified condition (such as disclosed in Japanese Patent Publication Tokkai 2003-179), and a method of adding tomato flavor collected from an extract of tomato fruits (such as disclosed in Japanese Patent Publication Tokkai 1-247059). Even such processed tomato products thus produced have the problem, however, that the tomato aroma inherent to tomato fruit is still far from sufficient.

SUMMARY OF THE INVENTION

It is therefore an object of this invention to provide a method by which processed tomato products having more tomato aroma inherent to tomato fruit can be obtained.

In view of the above, this invention relates to a method of producing a processed tomato product, said method comprising the steps of washing grown tomatoes, crushing the washed tomatoes, extracting juice from the crushed tomatoes, deaerating the extracted juice, and heating the deaerated juice, wherein temperature of the crushed tomatoes and the extracted juice from immediately after the crushing until immediately before the deaerating is maintained at 15-40° C., and more preferably at 20-30° C. One of the characteristics of the method according to this invention is to maintain the crushed tomatoes and the extracted juice at a relatively low temperature from immediately after the crushing until immediately before the deaerating. Thus, if necessary, at least one of the temperatures of the washed tomatoes, the crushed tomatoes and the extracted juice is adjusted to the aforementioned range.

According to this invention, not only are tomato fruits washed and crushed, juice being extracted and deaerated and the deaerated juice being heated, the dissolved oxygen concentration of the crushed tomatoes and/or the extracted juice is raised at least temporarily to 6 mg/L or over and more preferably to 6-10 mg/L from immediately after the crushing until immediately before the deaerating, and the dissolved oxygen concentration of the deaerated juice immediately before the heating is reduced to 3.5 mg/L or below. Another characteristic of the method according to this invention is that the dissolved oxygen concentration of the crushed tomatoes and/or the extracted juice from immediately after the crushing until immediately before the deaerating is raised to a relatively high level as described above and the dissolved oxygen concentration of the deaerated material immediately before the heating is reduced to a low level as described above.

It is the crushed tomatoes and/or the extracted juice of which the dissolved oxygen concentration is raised at least temporarily to the relatively high level of 6 mg/L or above, and more preferably 6-10 mg/L. It may be only the crushed tomatoes, only the extracted juice or both the crushed tomatoes and the extracted juice. The time during which the dissolved oxygen concentration of the crushed tomatoes and/or the extracted juice should be raised to such relatively high level may be only temporary or throughout the period during which tomatoes are in the condition of being crushed and/or an extracted juice. When the series of processes of crushing washed tomatoes, extracting juice from the crushed material and deaerating the extracted juice are generally carried out, the expression "temporarily" in the above may mean the time required for carrying out these processes but it is 1 second or longer, if it must be expressed numerically.

Depending on the kinds of the devices used for crushing tomatoes and extracting juice, as well as on the ways in which they are operated, the crushed material and the extracted juice may become aerated and their dissolved oxygen concentration may become raised to a relatively high level, as described above. In such a situation, there is no need to specifically carry out any operation for raising the dissolved oxygen concentration (hereinafter referred to as an aeration process). In other situations, however, an aeration process such as by bubbling and/or stirring is carried out on the crushed material and/or the extracted juice. On the other hand, the dissolved oxygen concentration of the deaerated material immediately before the heating process is reduced to the relatively low level described above due to the deaerating process, say, by reduced-pressure deaerating and bubbling of an inactive gas. According to the method of this invention, the deaerated material after the deaerating process is heated. The heating process thus carried out is principally for enzyme deactivation and is carried out such that the temperature of the deaerated material becomes 80° C. or over but there are situations where a heating process is carried out for the purpose of sterilization.

By the method of this invention, it is possible to produce processed tomato products having the tomato aroma inherent to tomato fruit.

BRIEF DESCRIPTION OF THE DRAWINGS

FIG. 1 shows a GC/MS chart of tomato juice of this invention according to Test Example 1.

DETAILED DESCRIPTION OF THE INVENTION

The invention is described next by way of test and comparison examples.

The following examples of tomato juice were produced and evaluated. The conditions for the production of each are shown in Table 1 and the results of evaluations are shown in Table 2.

Part 1

Production of Tomato Juice

Test Examples 1-7 and Comparison Examples 2-5

Tomato fruits were washed and the washed tomatoes were maintained inside a constant temperature container at a set temperature. The washed tomatoes maintained such that the temperature of the crushed tomatoes immediately after they were crushed becomes as shown in Table 1 were crushed by means of a biaxial rotary crushing machine inside the constant temperature container maintained at the same temperature. An aeration process was carried out by stirring while sending air into the crushed material inside a receiver tank to cause bubbling such that the dissolved oxygen concentration of the aerated material would come to the level shown in Table 1. The aerated material was extracted for extracting juice by using a press-type extracting device. The extracted juice was immediately provided to a batch-type vacuum device outside the aforementioned constant temperature container such that the dissolved oxygen concentration of the deaerated material came to be as described in Table 1. The deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice. For each of the examples, the dissolved oxygen concentration was the value obtained by measuring with a dissolved oxygen concentration meter (type HQ30d produced by Hach Company).

Comparison Example 1

Tomato fruits were washed and the washed tomatoes were maintained inside a constant temperature container at a set temperature of 20° C. The washed tomatoes thus maintained was crushed by means of a biaxial rotary crushing machine inside the constant temperature container maintained at 20° C. The dissolved oxygen concentration of the crushed material was 1.0 mg/L as shown in Table 1. The crushed material was preliminarily heated to 60° C. by means of a tubular heating device outside the aforementioned constant temperature container and juice was extracted from the preliminarily heated crushed material by using a press-type extracting device. The extracted juice was immediately provided to a batch-type vacuum device to be deaerated, the deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice.

Comparison Example 6

Tomato fruits were washed and the washed tomatoes were maintained inside a constant temperature container at a set temperature of 20° C. The washed tomatoes thus maintained were crushed by means of a biaxial rotary crushing machine inside a constant temperature container maintained at 20° C. The crushed material was preliminarily heated to 60° C. by means of a tubular heating device outside the aforementioned constant temperature container and an aeration process was carried out by stirring while sending air to the preliminarily heated crushed material to cause bubbling. The dissolved oxygen concentration of the aerated material was 5.4 mg/L as shown in Table 1. Juice was extracted from the aerated material by using a press-type extracting device and the extracted juice was immediately provided to a batch-type vacuum device to be deaerated such that the dissolved oxygen concentration of the deaerated material came to be as shown in Table 1. The deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice.

Comparison Example 7

Tomato fruits were washed and the washed tomatoes were maintained inside a constant temperature container at a set temperature of 20° C. The washed tomatoes thus maintained were crushed by means of a biaxial rotary crushing machine inside a constant temperature container maintained at 20° C., and an aeration process was carried out by stirring while sending air to the crushed material inside a receiver tank to cause bubbling. The dissolved oxygen concentration of the aerated material was 8.0 mg/L as shown in Table 1. The aerated material was preliminarily heated to 60° C. by means of a tubular heating device outside the aforementioned constant temperature container and juice was extracted from the preliminarily heated aerated material by means of a press-type extraction device. The extracted juice was immediately provided to a batch-type vacuum device to be deaerated until the dissolved oxygen concentration of the deaerated material became as shown in Table 1. The deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice.

Test Examples 8-16 and Comparison Examples 8-11

Tomato fruits were washed and the washed tomatoes were maintained inside a constant temperature container at a set temperature. The washed tomatoes maintained such that the temperature of the crushed tomatoes immediately after they were crushed becomes as shown in Table 1 were crushed by means of a biaxial rotary crushing machine inside a constant temperature container maintained at the same temperature. Juice was extracted from the crushed material by means of a press-type extraction device. An aeration process was carried out by stirring while sending air to the extracted juice inside a receiver tank to cause bubbling such that the dissolved oxygen concentration of the aerated material came to be as shown in Table 1. The aerated material was immediately provided to a batch-type vacuum device outside the aforementioned constant temperature container to be deaerated such that the dissolved oxygen concentration of the deaerated material came to be as shown in Table 1. The deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice.

Comparison Example 12

Tomato fruits were washed and the washed tomatoes were maintained inside a constant temperature container at a set temperature of 20° C. The washed tomatoes thus maintained were crushed by means of a biaxial rotary crushing machine inside the constant temperature container maintained at 20°

C., and juice was extracted from the crushed material by means of a press-type extraction device. The extracted juice was preliminarily heated to 60° C. by means of a tubular heating device outside the aforementioned constant temperature container, and an aeration process was carried out by stirring while sending air to the preliminarily heated extracted juice inside a receiver tank to cause bubbling. The dissolved oxygen concentration of the aerated material was 5.4 mg/L as shown in Table 1. The aerated material was provided to a batch-type vacuum device to be deaerated such that the dissolved oxygen concentration of the deaerated material came to be as shown in Table 1. The deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice.

Comparison Example 13

Tomato fruits were washed and the washed tomatoes were maintained inside a constant temperature container at a set temperature of 20° C. The washed tomatoes thus maintained were crushed by means of a biaxial rotary crushing machine inside the constant temperature container maintained at 20° C., juice was extracted from the crushed material by means of a press-type extraction device, and an aeration process was carried out by stirring while sending air to the extracted juice inside a receiver tank to cause bubbling. The dissolved oxygen concentration of the aerated material was 8.0 mg/L as shown in Table 1. The aerated material was preliminarily heated to 60° C. by means of a tubular heating device outside the aforementioned constant temperature container, and the preliminarily heated aerated material was provided to a batch-type vacuum device to be deaerated such that the dissolved oxygen concentration of the deaerated material came to be as shown in Table 1. The deaerated material was heated to 121° C. by using a plate-type heating-cooling device, maintained for 40 seconds, filled into a container after being cooled to 93° C. and cooled to 20° C. in a water tank after being sealed and maintained for 10 minutes to produce tomato juice.

Part 2

Evaluation of Produced Tomato Juice

For each example of tomato juice produced in Part 1, the relative value of aroma component concentration was obtained as explained below. Sensory evaluation was also carried out for general evaluation.

Relative Value of Aroma Component Concentration

The following five components were used as index for tomato aroma component: hexanal, E-2-hexenal, Z-3-hexenol, Z-3-hexenal and hexanol. After each example of tomato juice was preliminarily treated by the dynamic head space method, the peak area of each aroma component was measured by a commonly known method using GC/MS, concentrations were calculated from calibration lines prepared by using a standard item for each aroma component, and the aroma component concentration was obtained by summing them up. Relative values were obtained by using the aroma component concentration of Comparison Example 1 as the standard value and dividing the aroma component concentrations of the other examples by this standard value. The aforementioned pre-treatment by the dynamic head space method was carried out by using a pear-shaped flask of capacity 50 ml to accurately measure 1 g of each example of tomato juice, using distilled water to make the total weight equal to 30 g, causing the aroma components to become adsorbed to a tenax tube having TenaxTA (tradename, produced by Gerstel Kabushiki Kaisha) 2 g as adsorbent for 30 minutes at 45° C. by using nitrogen (with flow rate of 40 ml/min) as purge gas, and drying the tenax tube with nitrogen after the adsorption. The analysis by GC/MS was carried out by a method of setting the dried tenax tube in the sample introduction part of GC/MS (produced by Agilent Technologies, Inc.; column=J&W DB-WAX 60 m×0.25 mm×0.5 μm) and measuring the aroma components by introducing into the instrument by desorption by heating.

FIG. 1 is a GC/MS chart when a tomato juice sample of Test Example 5 was treated as explained above, numeral 1 indicating the peak by hexanal, numeral 2 indicating the peak by Z-3-hexenal, numeral 3 indicating the peak by E-2-hexenal, numeral 4 indicating the peak by hexanol and numeral 5 indicating the peak by Z-3-hexenol.

Sensory Evaluation

Twenty identifier panelists (including ten men and ten women) having the ability to distinguish differences among tomato aromas were employed for carrying out two-point comparisons of each example with respect to Comparison Example 1 to select which has stronger tomato aroma. For each example other than Comparison Example 1, the number of panelists who concluded that the other (than Comparison Example 1) example has stronger tomato aroma than Comparison Example 1 was counted and a significant difference was determined on the basis of these numbers.

Overall Evaluation

Overall evaluation was carried out according to the following standards:

A: The relative value of aroma component concentration is twice or more of the standard and there is a significant difference in the sensory evaluation (significance level 0.1%)

B: The relative value of aroma component concentration is 1.5 times or more of the standard and there is a significant difference in the sensory evaluation (significance level 1%)

C: Neither of the conditions above is satisfied.

TABLE 1

| | Production process | Temperature of crushed material (° C.) | Dissolved oxygen concentration of aerated material (mg/L) | Dissolved oxygen concentration of deaerated material (mg/L) |
|---|---|---|---|---|
| TE-1 | CR→AE→EX | 15 | 6.0 | 3.5 |
| TE-2 | CR→AE→EX | 15 | 8.0 | 3.5 |
| TE-3 | CR→AE→EX | 15 | 10.0 | 3.5 |
| TE-4 | CR→AE→EX | 20 | 6.0 | 3.5 |
| TE-5 | CR→AE→EX | 20 | 8.0 | 3.5 |
| TE-6 | CR→AE→EX | 30 | 6.0 | 3.5 |
| TE-7 | CR→AE→EX | 40 | 6.0 | 3.5 |
| CE-1 | CR→PH→EX | 20→60 | 1.0 | — |
| CE-2 | CR→AE→EX | 10 | 8.0 | 3.5 |
| CE-3 | CR→AE→EX | 50 | 6.0 | 3.5 |
| CE-4 | CR→AE→EX | 20 | 5.0 | 3.5 |
| CE-5 | CR→AE→EX | 20 | 8.0 | 5.0 |
| CE-6 | CR→PH→AE→EX | 20→60 | 5.4 | 3.5 |
| CE-7 | CR→AE→PH→EX | 20→60 | 8.0 | 3.5 |
| TE-8 | CR→EX→AE | 15 | 6.0 | 3.5 |
| TE-9 | CR→EX→AE | 15 | 8.0 | 3.5 |
| TE-10 | CR→EX→AE | 15 | 10.0 | 3.5 |
| TE-11 | CR→EX→AE | 20 | 6.0 | 3.5 |
| TE-12 | CR→EX→AE | 20 | 8.0 | 3.5 |
| TE-13 | CR→EX→AE | 30 | 6.0 | 3.5 |
| TE-14 | CR→EX→AE | 40 | 6.0 | 3.5 |
| TE-15 | CR→EX→AE | 20 | 8.0 | 2.5 |
| TE-16 | CR→EX→AE | 40 | 6.0 | 1.5 |

TABLE 1-continued

|  | Production process | Temperature of crushed material (° C.) | Dissolved oxygen concentration of aerated material (mg/L) | Dissolved oxygen concentration of deaerated material (mg/L) |
|---|---|---|---|---|
| CE-8 | CR→EX→AE | 10 | 8.0 | 3.5 |
| CE-9 | CR→EX→AE | 50 | 6.0 | 3.5 |
| CE-10 | CR→EX→AE | 20 | 5.0 | 3.5 |
| CE-11 | CR→EX→AE | 20 | 8.0 | 5.0 |
| CE-12 | CR→EX→PH→AE | 20→60 | 5.4 | 3.5 |
| CE-13 | CR→EX→AE→PH | 20→60 | 8.0 | 3.5 |

In Table 1:
TE: Test Example
CE: Comparison Example
CR: Crushing process
AE: Aeration process
EX: Juice extraction process
PH: Preliminary heating process

TABLE 2

Evaluation of tomato juice

|  | Relative value of aroma component concentration | Sensory evaluation | | |
|---|---|---|---|---|
|  |  | Number of panelists | Significant difference (significance level) | Overall evaluation |
| TE-1 | 1.93 | 16 | Present(1%) | B |
| TE-2 | 2.06 | 17 | Present (1%) | B |
| TE-3 | 1.95 | 17 | Present (1%) | B |
| TE-4 | 2.41 | 20 | Present (0.1%) | A |
| TE-5 | 2.69 | 20 | Present (0.1%) | A |
| TE-6 | 2.24 | 20 | Present (0.1%) | A |
| TE-7 | 1.76 | 16 | Present (1%) | B |
| CE-1 | (Standard) | (Reference) | — | — |
| CE-2 | 0.67 | 12 | Absent | C |
| CE-3 | 1.00 | 13 | Absent | C |
| CE-4 | 1.47 | 14 | Absent | C |
| CE-5 | 1.34 | 14 | Absent | C |
| CE-6 | 0.89 | 11 | Absent | C |
| CE-7 | 0.78 | 10 | Absent | C |
| TE-8 | 1.84 | 16 | Present (1%) | B |
| TE-9 | 2.16 | 17 | Present (1%) | B |
| TE-10 | 1.98 | 17 | Present (1%) | B |
| TE-11 | 2.69 | 20 | Present (0.1%) | A |
| TE-12 | 2.83 | 20 | Present (0.1%) | A |
| TE-13 | 2.41 | 20 | Present (0.1%) | A |
| TE-14 | 1.91 | 16 | Present (1%) | B |
| TE-15 | 2.87 | 20 | Present (0.1%) | A |
| TE-16 | 1.96 | 16 | Present (1%) | B |
| CE-8 | 0.72 | 12 | Absent | C |
| CE-9 | 0.95 | 13 | Absent | C |
| CE-10 | 1.65 | 14 | Absent | C |
| CE-11 | 1.47 | 14 | Absent | C |
| CE-12 | 0.89 | 10 | Absent | C |
| CE-13 | 0.61 | 10 | Absent | C |

What is claimed is:

1. A method of producing a processed tomato product, said method comprising the steps of:
   washing grown tomatoes;
   crushing the washed tomatoes;
   extracting juice from the crushed tomatoes;
   deaerating the extracted juice; and
   heating the deaerated juice;
   wherein temperature of the crushed tomatoes and the extracted juice from immediately after the crushing until immediately before the deaerating is maintained at 15-40° C.;
   wherein dissolved oxygen concentration of at least either of the crushed tomatoes and the extracted juice from immediately after the crushing until immediately before the deaerating is raised at least temporarily to 6 mg/L or over; and
   wherein dissolved oxygen concentration of the deaerated juice immediately before the heating is reduced to 3.5 mg/L or below.

2. The method of claim 1 further comprising the step of aerating at least either of the crushed tomatoes and the extracted juice from immediately after the crushing until immediately before the deaerating.

3. The method of claim 1 wherein temperature of the crushed tomatoes and the extracted juice from immediately after the crushing until immediately before the deaerating is maintained at 20-30° C.

4. The method of claim 2 wherein temperature of the crushed tomatoes and the extracted juice from immediately after the crushing until immediately before the deaerating is maintained at 20-30° C.

5. The method of claim 1 wherein dissolved oxygen concentration of at least either of the crushed tomatoes and the extracted juice from immediately after the crushing until immediately before the deaerating is raised at least temporarily to 6-10 mg/L.

6. The method of claim 2 wherein dissolved oxygen concentration of at least either of the crushed tomatoes and the extracted juice from immediately after the crushing until immediately before the deaerating is raised at least temporarily to 6-10 mg/L.

7. The method of claim 3 wherein dissolved oxygen concentration of at least either of the crushed tomatoes and the extracted juice from immediately after the crushing until immediately before the deaerating is raised at least temporarily to 6-10 mg/L.

8. The method of claim 4 wherein dissolved oxygen concentration of at least either of the crushed tomatoes and the extracted juice from immediately after the crushing until immediately before the deaerating is raised at least temporarily to 6-10 mg/L.

9. The method of claim 1 wherein the step of heating is carried out at 80° C. or above.

10. The method of claim 2 wherein the step of heating is carried out at 80° C. or above.

11. The method of claim 3 wherein the step of heating is carried out at 80° C. or above.

12. The method of claim 4 wherein the step of heating is carried out at 80° C. or above.

13. The method of claim 5 wherein the step of heating is carried out at 80° C. or above.

14. The method of claim 6 wherein the step of heating is carried out at 80° C. or above.

15. The method of claim 7 wherein the step of heating is carried out at 80° C. or above.

16. The method of claim 8 wherein the step of heating is carried out at 80° C. or above.

* * * * *